(12) United States Patent
Amidei et al.

(10) Patent No.: US 8,585,804 B2
(45) Date of Patent: Nov. 19, 2013

(54) NATURAL GAS LIQUIDS RECOVERY DEVICE AND METHOD

(75) Inventors: Simone Amidei, Florence (IT);
Francesca Monti, Florence (IT);
Andrea Giusti, Florence (IT); Mesgina Tsegai Risat, Houston, TX (US)

(73) Assignee: Nuovo Pignone S.p.A., Florence (IT)

( * ) Notice: Subject to any disclaimer, the term of this patent is extended or adjusted under 35 U.S.C. 154(b) by 240 days.

(21) Appl. No.: 13/109,037

(22) Filed: May 17, 2011

(65) Prior Publication Data

US 2011/0289962 A1 Dec. 1, 2011

(30) Foreign Application Priority Data

May 31, 2010 (IT) ............................... CO2010A0031

(51) Int. Cl.
*F25J 3/08* (2006.01)

(52) U.S. Cl.
USPC .................. 95/117; 96/108; 62/618; 585/820

(58) Field of Classification Search
USPC ................. 95/117; 96/108, 121; 62/618–619; 585/800, 820
See application file for complete search history.

(56) References Cited

U.S. PATENT DOCUMENTS

| | | | |
|---|---|---|---|
| 3,205,669 A | | 9/1965 | Grossman |
| 3,735,600 A | * | 5/1973 | Dowdell et al. ................. 62/619 |
| 3,894,856 A | * | 7/1975 | Lofredo et al. ................. 95/115 |
| 3,967,464 A | | 7/1976 | Cormier et al. |
| 4,157,904 A | | 6/1979 | Campbell et al. |
| 4,444,577 A | | 4/1984 | Perez |
| 4,519,824 A | | 5/1985 | Huebel |
| 5,992,175 A | | 11/1999 | Yao et al. |
| 6,023,942 A | * | 2/2000 | Thomas et al. ................. 62/613 |
| 6,128,919 A | * | 10/2000 | Daus et al. ....................... 62/624 |
| 6,209,350 B1 | * | 4/2001 | Kimble, III ..................... 62/613 |
| 7,713,497 B2 | * | 5/2010 | Mak .............................. 422/187 |
| 2009/0282863 A1 | * | 11/2009 | Lourenco et al. ............... 62/619 |
| 2010/0011663 A1 | | 1/2010 | Coyle |

FOREIGN PATENT DOCUMENTS

| | | |
|---|---|---|
| DE | 102007010874 A1 | 9/2008 |
| EP | 1253388 A1 | 10/2002 |
| WO | 2009064569 A1 | 5/2009 |

OTHER PUBLICATIONS

Tannehill, C.C. and Gibbs, J.E., 1991, "Evaluation of Hydrocarbon Liquid Disposition", GRI Topical Report No. GRI-91/0231, 47 pages.
Rathmann, U., et al.; "Which Liquefaction Process Suits Best for LNG-Peakshaving Plants?" Cryogenic Processes and Equipment. Symposium, Jan. 1, 1984, pp. 7-18, XP009114370.
Ballout, N.C., et al.; "Comparison of Present Day Peakshavings Liquefaction Technologies", Aiche Spring Meeting. Natural Gas Utilization Conference, X, US, vol. 8th, Apr. 6, 2008.
Italian Search Report and Written Opinion issued in connection with IT Application No. ITCO201000031, Mar. 15, 2011.

* cited by examiner

*Primary Examiner* — Frank Lawrence, Jr.
(74) *Attorney, Agent, or Firm* — Global Patent Operation

(57) ABSTRACT

A natural gas liquids (NGL) recovery system and method for separating NGLs from a feed gas is provided. The method includes receiving the feed gas; increasing a pressure of the feed gas by running the feed gas through a compressor connected to a gas turbine; diverting part of the feed gas from an output of the compressor and feeding the diverted part to a dryer; drying the diverted part to remove water and produce a dry gas; expanding the dry gas in a turbo-expander; separating the expanded gas into the NGL and fuel gas; and providing the fuel gas to the gas turbine as fuel without contamination.

20 Claims, 8 Drawing Sheets

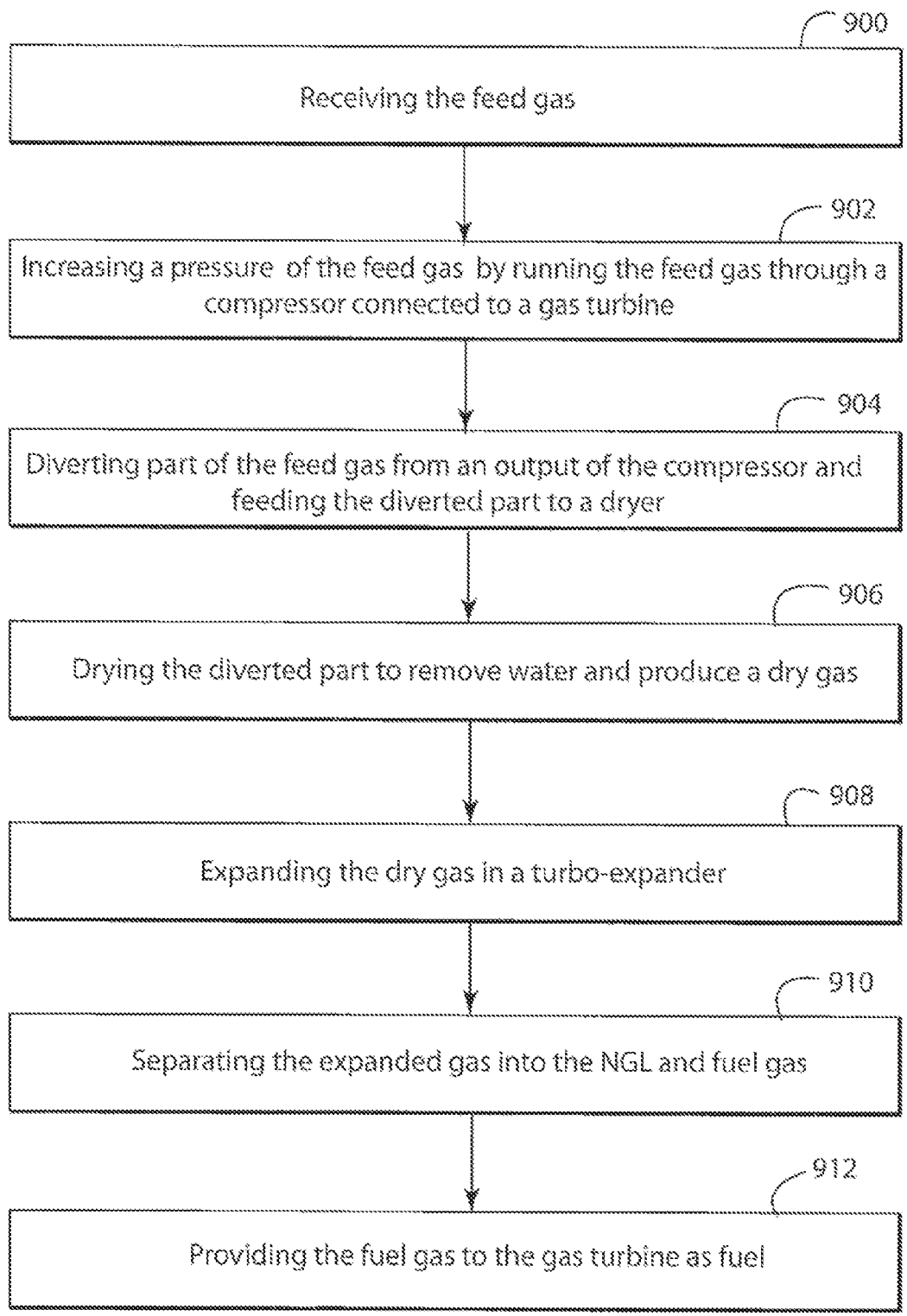

NATURAL GAS LIQUIDS RECOVERY DEVICE AND METHOD

BACKGROUND OF THE INVENTION

1. Field of the Invention

Embodiments of the subject matter disclosed herein generally relate to methods and systems and, more particularly, to mechanisms and techniques for recovering natural gas liquids (NGL).

2. Description of the Prior Art

During the past years, with the increase in price of gas and oil fuels, many aspects of the extraction, transportation and processing of the gas and oil have received increased attention. There is an interest in making the existing machines and processes more efficient and reliable and also for reducing the waste associated with many aspects of oil and gas industry.

FIG. 1 shows part of the infrastructure used for extracting, transporting and processing the oil and/or gas, simply called from now on the product. Such a system 10 includes at least an extraction facility 12 that may be on shore (as shown in the figure) or off-shore (not shown). Such extraction facility 12 may be a rig or other known devices that drill underground for reaching a reservoir 14 of oil and/or gas. Once the product is brought to the surface 16, it may be stored in a storage facility 18. As most of the times the extraction facility is located far from a processing facility, the product needs to be transported, some times over thousands of miles. Thus, a pumping facility 20 may be provided next to the storage facility 18. The pumping facility 20 may include a generic pumping and pumping systems to increase the pressure of the product before entering an inlet 22 of a transportation pipeline 24. The transportation pipeline may be distributed above ground (not shown) and underground as shown in FIG. 1. As the pressure of the product decreases while moving along the pipeline 24, pumping stations 26 are provided along the pipeline 24 for boosting the pressure of the product.

Typically, a pumping station includes at least a pump if the product is a liquid or at least a compressor if the product is a gas. For simplicity, it is assumed in the following that the product is a gas. Thus, a compression station 26 includes one or more compressors and a gas turbine that powers the compressor. The gas turbine is configured to divert part of the product from the pipeline 24 as fuel. At the end of the journey, the product arrives at the processing facility 28 where the product is separated in various components 30. These components are then sold to the appropriate customers.

One example of a product is the raw natural gas. Raw natural gas consists primarily of methane ($CH_4$), the shortest and lightest hydrocarbon molecule, as well as various amounts of heavier hydrocarbon gases such as ethane ($C_2H_6$), propane ($C_2H_8$), normal butane ($n-C_4H_{10}$), isobutane ($i-C_4H_{10}$), pentanes and even higher molecular weight hydrocarbons. Based on the number of carbons, these components are sometimes classified as C, $C_1$, $C_2$, $C_3$, etc. The raw gas also contains various amounts of acid gases such as carbon dioxide ($CO_2$), hydrogen sulfide ($H_2S$) and mercaptans such as methanethiol ($CH_3SH$) and ethanethiol ($C_2H_5SH$).

When processed into finished by-products, these heavier hydrocarbons are collectively referred to as NGL. The extraction of the NGL often involves a turbo-expander and a low-temperature distillation column (called a demethanizer). The inlet gas to the demethanizer may be cooled in a heat exchanger which partially condenses the inlet gas. The resultant gas-liquid mixture is then separated in a separator into a gas stream and a liquid stream. Typical processing facilities are complex and include demethanizer units, multiple separators, separated refrigeration loops, glycol injecting units, etc.

However, there are situations when at least parts of the above noted system 10 in a gas station/pipeline are desired to have a simplified, structure or to provide fuel at a given specification or to prevent the gas turbines to burn NGLs. Regarding the simplified structure, it is noted the complexity of the processing facility 28, which requires multiple separators, at least a demethanizer unit, and other components makes the footprint of the facility large and also makes the facility prone to failures. Also, it is noted that the compression stations 26 may include compressors which are driven by gas turbines which need fuel with certain specifications for their functioning. As the compression stations 26 transport natural gas, many of the compression stations 26 use part of the natural gas as fuel. However, the transported natural gas could not be appropriate for being burned in a gas turbine (might not meet those specifications). Thus, an amount of pollution is increased by feeding the gas turbine with untreated natural gas. In addition, the amount of the NGLs in the transported natural gas is reduced due to the fact that the NGL is used as fuel within natural gas/together with methane.

Accordingly, it would be desirable to provide systems and methods that avoid the afore-described problems and drawbacks.

SUMMARY OF THE INVENTION

According to one exemplary embodiment, there is a natural gas liquids (NGL) recovery system. The system includes an inlet configured to receive feed gas from a first location of a transportation pipeline; a dehydration unit connected to the inlet to receive the feed gas and configured to extract predetermined components from the feed gas to produce a dry gas; a NGL unit configured to receive the dry gas from the dehydration unit and configured to separate the dry gas into a fuel gas and a NGL mix; a first outlet connected to the NGL unit and configured to output the fuel gas to a gas turbine to be ignited; and a second outlet connected to the NGL unit and configured to output the NGL mix back to the transportation pipeline, at a second location situated downstream from the first location.

According to another exemplary embodiment, there is a station for pumping natural gas liquids (NGL) in a transportation pipeline. The station includes turbo-compressor package connected to a pipeline inlet and configured to raise a low pressure of an input feed gas to a high pressure; an NGL recovery package connected to the turbo-compressor package and configured to receive the feed gas having the high pressure; and a filter package configured to receive a fuel gas from the NGL recovery package, to heat and filter the received fuel gas, and to provide the heated and filtered fuel gas to the turbo-compressor as fuel. The NGL recovery package includes an inlet configured to receive the feed gas from a first location of the transportation pipeline, a dehydration unit connected to the inlet to receive the feed gas and configured to extract predetermined components from the feed gas to produce a dry gas, a NGL unit configured to receive the dry gas from the dehydration unit and configured to separate the dry gas into a fuel gas and a NGL mix, a first outlet connected to the NGL unit and configured to output the fuel gas to the filter package, and a second outlet connected to the NGL unit and configured to output the NGL mix back to the transportation pipeline, at a second location situated downstream from the first location.

According to still another exemplary embodiment, there is a processing system for separating natural gas liquids (NGL). The system includes a turbo-compressor package configured to raise a low pressure of an input feed gas to a high pressure; an NGL recovery package connected to the turbo-compressor package and configured to receive the feed gas having the high pressure; and a filter package configured to receive a fuel gas from the NGL recovery package, to heat and filter the received fuel gas, and to provide the heated and filtered fuel gas to the turbo-compressor as fuel. The NGL recovery package includes an inlet configured to receive the feed gas, a dehydration unit connected to the inlet to receive the feed gas and configured to extract predetermined components from the feed gas to produce a dry gas, a NGL unit configured to receive the dry gas from the dehydration unit and configured to separate the dry gas into a fuel gas and a NGL mix, a first outlet connected to the NGL unit and configured to output the fuel gas to the filter package, and a second outlet connected to the NGL unit and configured to output the NGL mix.

According to another exemplary embodiment, the above noted system has the NGL unit without a demethanizer, or a glycol injecting unit. In one application, the NGL unit may include only one separator and the dehydration unit does not include a separator and a cooler.

According to yet another exemplary embodiment, there is a method for separating natural gas liquids (NGL) from a feed gas. The method includes receiving the feed gas; increasing a pressure of the feed gas by running the feed gas through a compressor connected to a gas turbine; diverting part of the feed gas from an output of the compressor and feeding the diverted part to a dryer; drying the diverted part to remove water and produce a dry gas; expanding the dry gas in a turbo-expander; separating the expanded gas into the NGL and fuel gas; and providing the fuel gas to the gas turbine as fuel.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 9 is a flow chart illustrating a method for recovering NGL mix according to an exemplary embodiment.

DETAILED DESCRIPTION OF THE INVENTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a compression station along a transportation pipeline. However, the embodiments to be discussed next are not limited to these stations, but may be applied to other systems or stations that recover NGL, as for example, those present in a processing facility.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, a compression station may include an NGL recovery unit that separates the NGL from the feed gas and provides a fuel gas that does not include the NGL to a gas turbine and reintroduces the NGL into a transportation pipeline. According to another exemplary embodiment, the NGL recovery unit includes a dryer unit that has a simplified structure relative to the existing dryers. According to still another exemplary embodiment, a processing facility that separates NGL from a natural gas stream includes a dryer and an NGL recovery unit that has a simplified structure, e.g., does not include a demethanizer and also does not include glycol injecting units.

Figure 1:
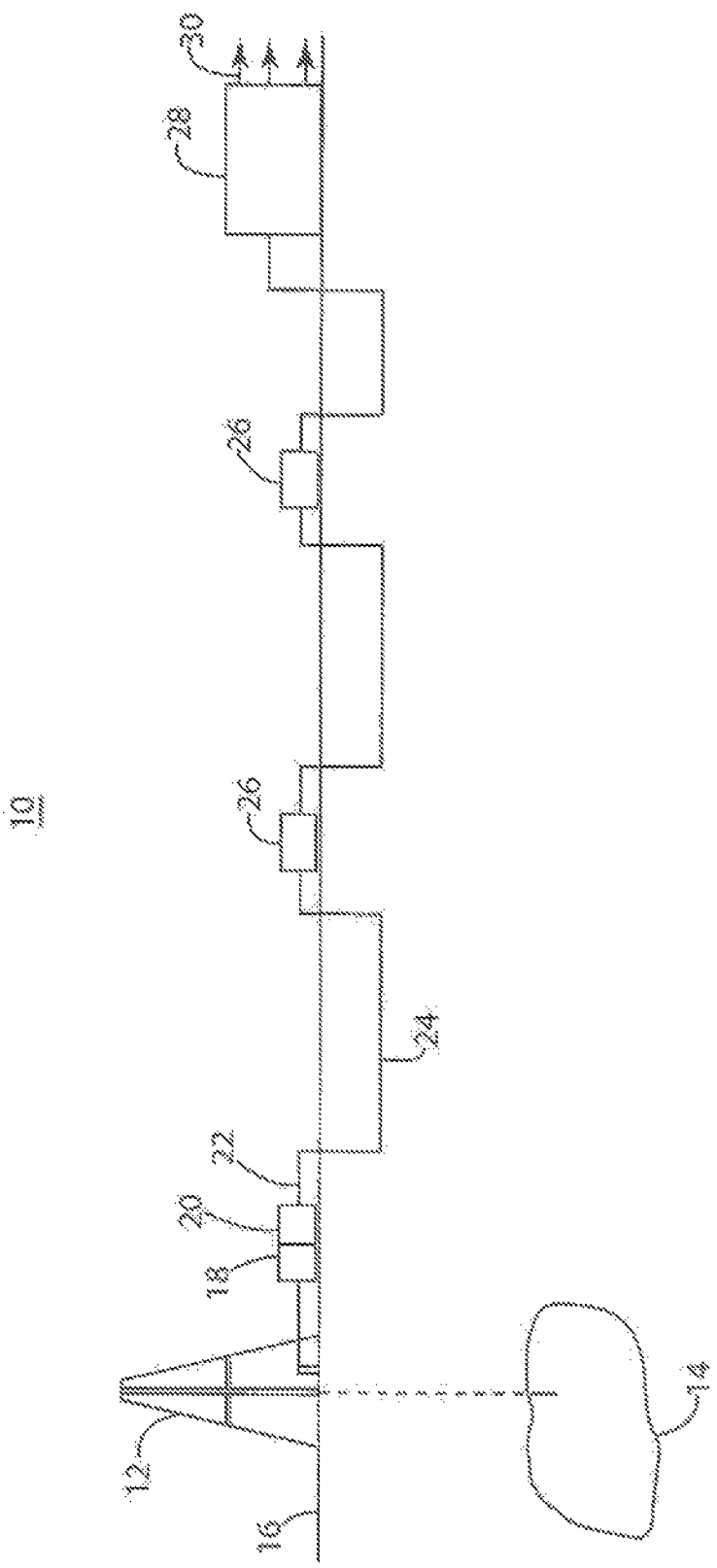
FIG. 1 is a schematic diagram of a conventional oil extraction, distribution and processing system.
Figure 2:
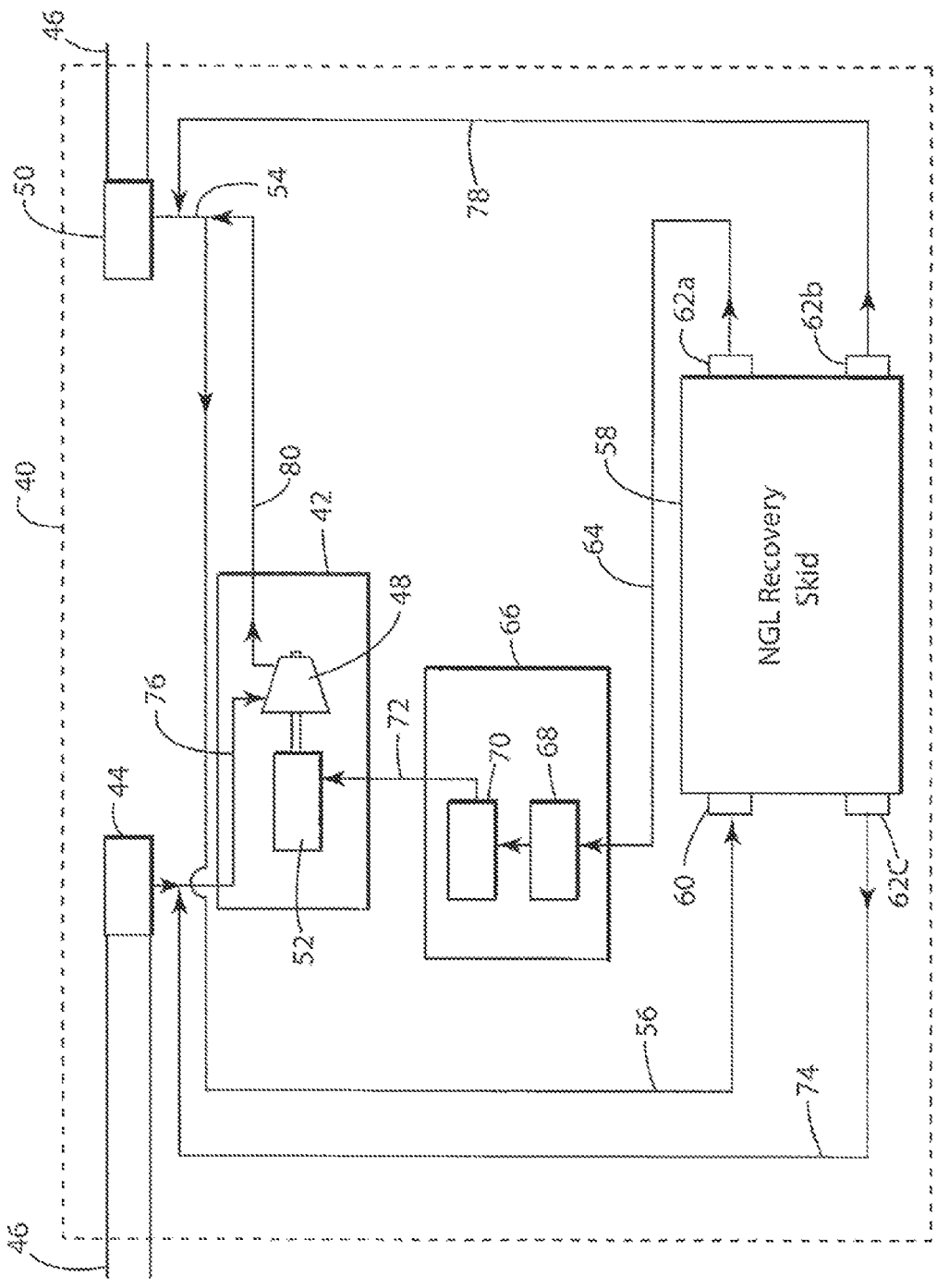
FIG. 2 is a schematic diagram of a compression station according to an exemplary embodiment.

According to an exemplary embodiment illustrated in FIG. 2, a compression station 40 includes a turbo-compressor package 42 connected to a pipeline inlet 44 of a transportation pipeline 46. Natural gas that flows through the pipeline 46 is directed to a compressor 48 of the turbo-compressor package 42 for being compressed such that a pressure of the natural gas is raised. The pressurized natural gas is then inserted, back to the pipeline 46, at an outlet 50. The outlet 50 is located downstream from inlet 44. According to an exemplary embodiment, the entire flow of natural gas through the pipeline 46 is routed through the compressor 48. In one application, other products than natural gas may be transported through pipeline 46.

Gas compressor 48 is driven by a turbo-machine 52. The turbo-machine 52 may be a gas turbine. The structure of a gas turbine is known in the art and is not repeated herein. Some gas turbines need a specific fuel in order to function. In one application, the gas turbine needs purified fuel in order to work and the natural gas flowing in pipe 46 cannot be used for such a scope unless processed to remove the NGLs. The gas turbine may be connected (directly or via a gear box or other known mechanism) to the compressor 48 for rotating the one or more impellers of the compressor.

Fuel for the gas turbine may be provided from the natural gas being transported through the pipeline 46. However, the fuel is selected from the natural gas as will be discussed next. Part of the natural gas flow at point 54 is deviated along path 56 to an NGL recovery package 58. The structure of the NGL recovery package 58 is discussed later in more details. The NGL recovery package has an inlet 60 at which the pressurized natural gas is received from compressor 48 and three outlets 62a to 62c at which various components of the natural gas are provided. The pressure of the natural gas at inlet 60 may be between 70 and 200 bar or higher depending on the type of compressor. In another exemplary embodiment, the pressure of the natural gas at inlet 60 is above cricondenbar. Cricondenbar defines a maximum pressure at which two phases of a same product can coexist and/or the pressure above which a gas phase of a fluid never condensates (dense phase).

Fuel gas is provided by the NGL recovery package 58 at outlet 62a. The fuel gas is directed along path 64 to a filter package 66. The filter package 66 may include a heater 68 that increases the temperature of the fuel gas and a filter 70 that removes unwanted components and/or impurities from the fuel gas. The filtered fuel gas is then supplied along path 72 to the gas turbine 52. As the fuel gas produced by the NGL recovery unit 58 may have a desired composition, burning this fuel in the gas turbine 52 is more efficient and may reduce an amount of pollution released into the environment. It is expected that an amount of $CO_2$ released by the gas turbine 52 of the compression station 40 is reduced relative to a traditional compression station as no (or reduced) NGL are provided in the fuel gas.

As part of the drying process performed by the NGL recovery package 58, an off-gas is produced and eliminated at output 62c. The composition of the off-gas is discussed later. The off-gas is provided along path 74 to an inlet 76 of the compressor 48 for being reused.

After separating the fuel gas and the off-gas from the feed gas provided at inlet 60, what is left is the NGL mix, which is provided by outlet 62b, along path 78 to an output 80 of the compressor 48. The compressed feed gas compressed by compressor 48 and the NGL mix are returned at outlet 50 of the transportation pipeline 46 for further transportation towards the final processing facility.

As earlier discussed, although the general description of the NGL recovery package 58 was provided in the context of a compression station 40 disposed along a transportation pipeline 46, the NGL recovery package 58 may also be provided in a processing facility to more efficiently separate the NGL mix from other components as will be discussed later.

Figure 3:
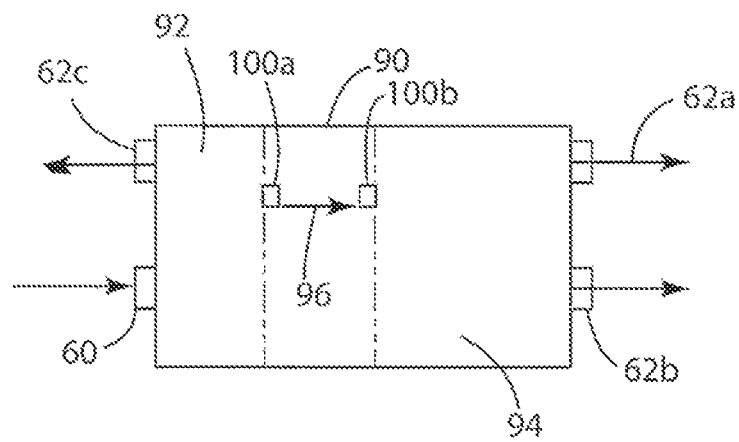
FIG. 3 is a schematic diagram of a NGL recovery package according to an exemplary embodiment.

The structure of the NGL recovery package 58 is now discussed in more details with regard to FIG. 3. According to an exemplary embodiment illustrated in FIG. 3, the NGL recovery package 58 includes a single skid 90 on which a dehydration unit 92 and an NGL unit 94 are provided, it is noted that in one application, the dehydration unit 92 and the NGL unit 94 are interconnected to each other and both units can be moved as a single unit.

The dehydration unit 92 is configured to receive the feed gas at inlet 60 and to expel the off-gas at outlet 62c. A dry gas produced by the dehydration unit 92 is provided at outlet 100a along path 96 to an inlet 100b of the NGL unit 94. After being processed in the NGL unit 94, the dry gas is separated into the fuel gas that is output at outlet 62a and the NGL mix that is output at outlet 62h. Providing the dehydration unit 92 on the same skid with the NGL unit 94 is advantageous as will be discussed later in addition, the processing facility has fewer components, becomes more modular and occupies less space. The structure of each of the dehydration unit 92 and the NGL unit 94 is discussed next.

Figure 4:
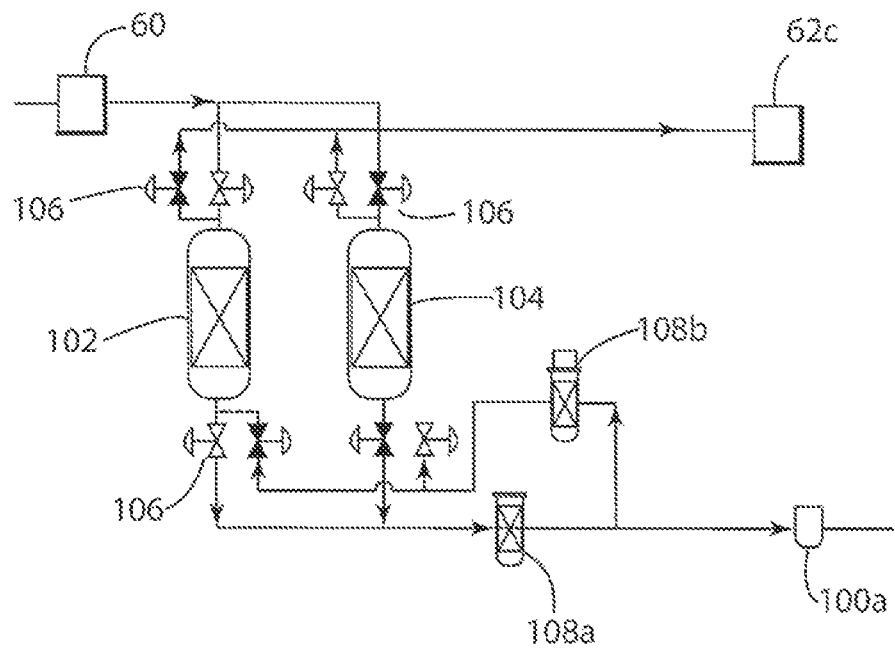
FIG. 4 is a schematic diagram of a dryer according to an exemplary embodiment.

According to an exemplary embodiment illustrated in FIG. 4, the dehydration unit 92 includes the inlet 60 at which the feed gas is received, the outlet 62c at which the off-gas is provided and the outlet 100a at which the dry gas is provided. The feed gas flows from the inlet 60 to a first molecular sieve 102 which is configured to remove certain components from the feed gas.

A molecular sieve is based on a material that has many pores with a certain diameter. The material may be considered to act as a sponge. Particles (molecules) having a smaller diameter than the diameter of the pores enter the molecular sieve while the particles having a larger diameter continue their flow to outlet 100a. A molecular sieve may have uniform size pores and may absorb gases and liquids. Materials from which the molecular sieve is made may include aluminosilicate minerals, clays, porous glasses, microporous charcoals, zeolites, active carbons or synthetic compounds. A molecular sieve is used in the oil and gas industry to absorb the water from the feed gas and for this reason the output gas at outlet 100a is called dry gas. However, depending on the material used in the molecular sieve, other components (as nitrogen, mercury, etc.) may be removed from the feed gas.

Because after a certain usage time the molecular sieve's pores may be partially or totally full with the absorbed molecules, a second molecular sieve 104 may be used to dry the feed gas while the molecular sieve 102 is regenerated. The regenerating process for the molecular sieve may include flowing a gas in opposite direction through the molecular sieve 102 and heating the molecular sieve and/or the gas to release the stored molecules/particles. The flow of the gas in opposite directions through the molecular sieves 102 and 104 may be obtained by using plural valves 106. Valves 106 are color coded in FIG. 4 to indicate whether they are open or close. FIG. 4 shows a situation in which the molecular sieve 102 is active and the molecular sieve 104 is regenerated (e.g., purged of the absorbed molecules). The output of the molecular sieve 104 (while being regenerated with the heater 108b) forms the off-gas that is provided at outlet 62c. Filter 108a may be provided to avoid the contamination of the treated gas by dusts released by the molecular sieves.

Figure 5:
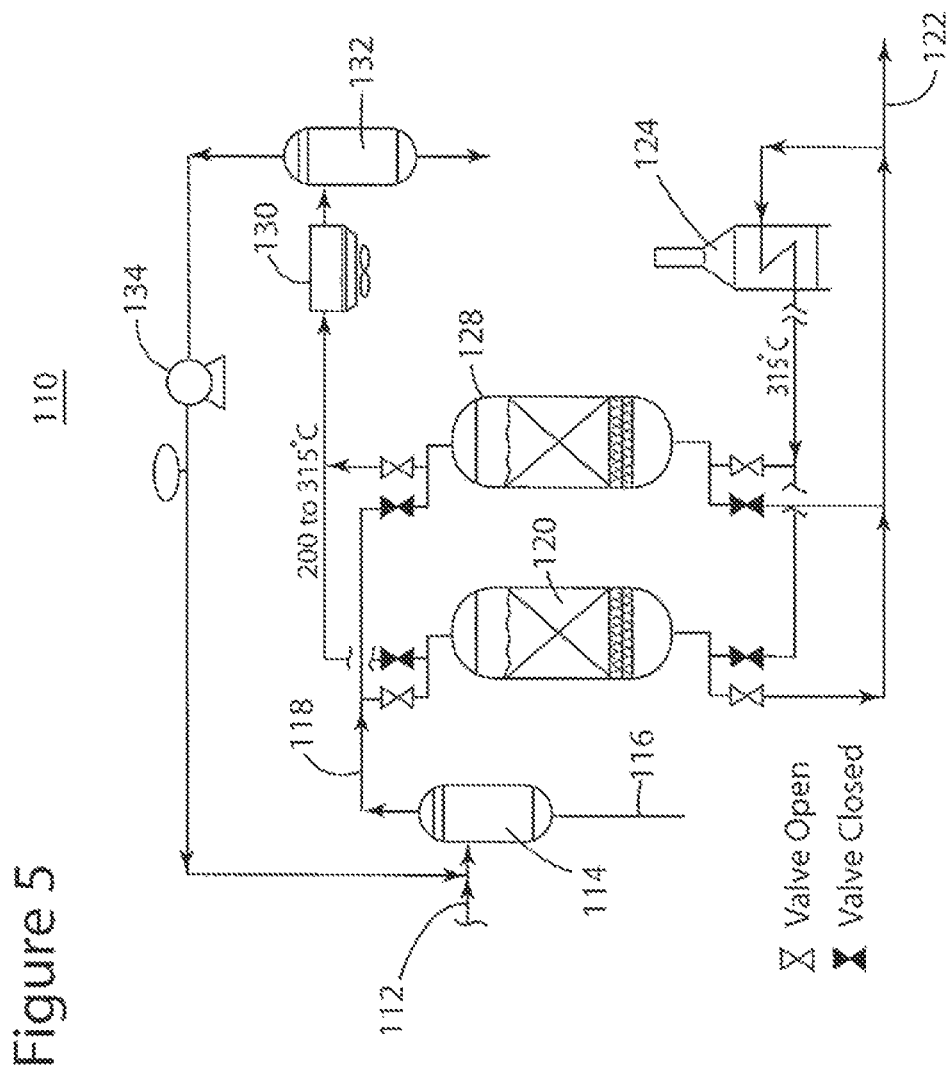
FIG. 5 is a schematic diagram of an alternative dryer.

It is noted the simplicity of the dehydration unit 92 due to the synergy with the main compressor driven by the gas turbine. For providing some perspective regarding the simplicity of the novel dehydration unit 92, FIG. 5 illustrates an alternative molecular sieve dehydration unit 110. A feed gas is provided at inlet 112 to a separator 114. A separator is used to separate a liquid from a gas. The separated liquid is output at outlet 116 while the separated gas is provided via path 118 to molecular sieve 120. Dry gas is obtained at outlet 122. However, for regenerating the molecular sieves, a heater 124 is required for heating part of the dry gas diverted from outlet 122. The diverted, dry gas has to be heated to around 300° C. and only then provided to molecular sieve 128. From here, the regeneration gas is provided to a cooler 128 for reducing a temperature of the gas and then to a water removing unit 132 for removing water. As the original feed gas was not provided at a high pressure, a compressor 134 is used to increase the pressure of the regeneration gas. From here, the regeneration gas is provided back to input 112 for recirculation. The technology shown in FIG. 5 is required when moisturized natural gas is fully dehydrated to be processed in cryogenic plants.

Thus, the novel structure shown in FIG. 4 does not need the separator 114, the regeneration gas cooler 130, the water removing unit 132, and the regeneration gas compressor 134.

One or more advantages achieved by the dehydration unit 92 of FIG. 4 include constant fuel gas composition during transitions (from one molecular sieve to another), no need of separator and cooler as well as effluent treatments, reduced costs due to lack of final recompression due to high initial pressure from turbo compressor discharge, simplified operations (minimal control loops), no risk of hydrates formation at cold ambient temperature, etc.

Figure 6:
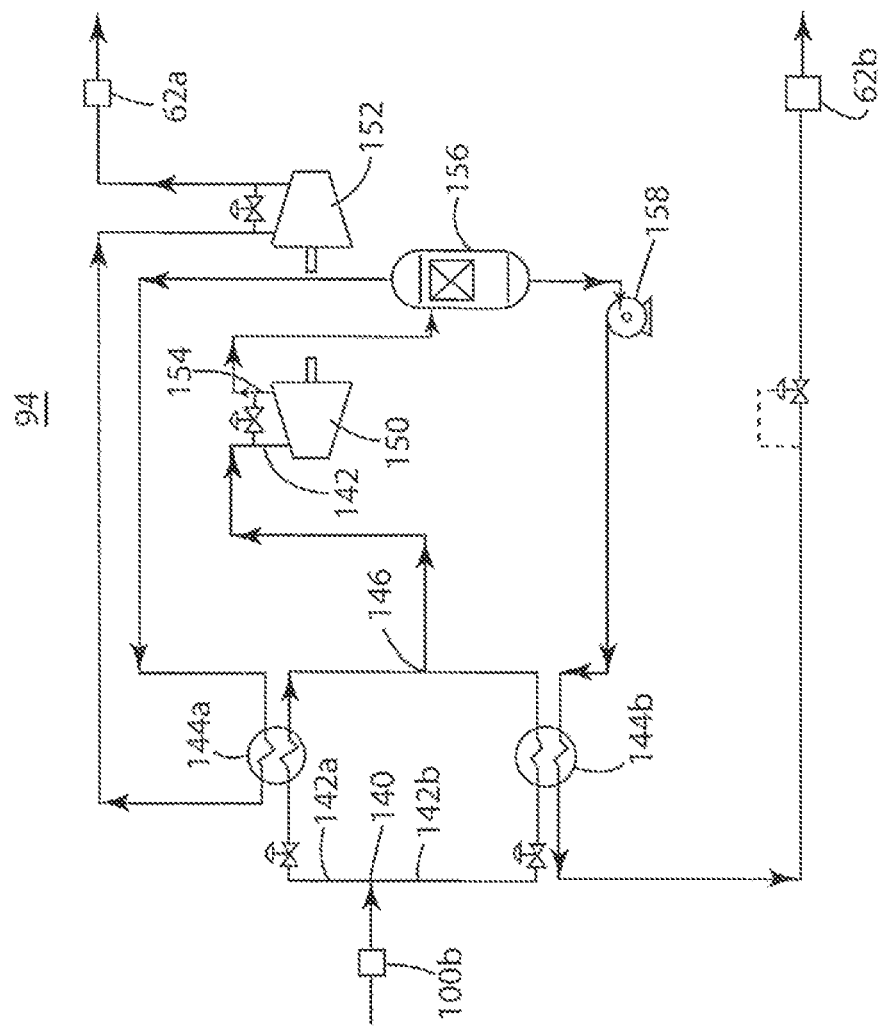
FIG. 6 is a schematic diagram of a NGL recovery unit according to an exemplary embodiment.

According to another exemplary embodiment illustrated in FIG. 6, the NGL unit 94 includes the dry gas inlet 100b, the NGL mix outlet 62b and the fuel gas outlet 62a. The incoming dry gas stream is split at point 140 into two streams 142a and 142b. Each stream is circulated through corresponding heat exchangers 144a and 141b for controlling a temperate of the dry gas. The two streams are reunited at point 146 and provided at an input 148 of an expander 150. Expander 150 may be connected to a compressor 152 and drives this compressor. The expanded dry gas is output at outlet 151 of the expander 150 and provided to a separator 156. Separator 156 removes a liquid (NGL mix) from a gas phase (fuel gas) and provides the liquid phase to a pump 158. Pump 158 pumps the NGL mix through heat exchanger 144b for cooling the mix and then provides the mix to outlet 62b, either for being returned to a transportation pipeline or for being used in various scopes. The fuel gas from separator 156 is provided to heat exchanger 144a for being cooled off, and then to compressor 152 for increasing its pressure prior to being provided to outlet 62a.

The structure of the NGL unit 94 shown in FIG. 6 is configured to handle an isentropic expansion (inside expander 150) of the high pressure (range 70-130 bar) feed gas from turbo compressor 42 (see FIG. 2) to produce cryogenic temperature to recover natural gas liquids (NGL). A condensed methane and C2+ stream enters the separator 156 for a two phase separation. The NGL and liquid methane exit from the bottom of the separator 156. The separated gas from the top forms the gas turbine fuel gas.

This structure may achieve one or more of the following advantages: high percentage NGL mix recovered from fuel gas (depends on the pressure value), lean fuel burned by the gas turbine ($CH_4$ richer, better quality, better economic value), maximum flexibility with different fuel gas compositions, reduced costs due to pressure drop between inlet and outlet, simplified operations (minimal control loops), and less $CO_2$ produced.

Figure 7:
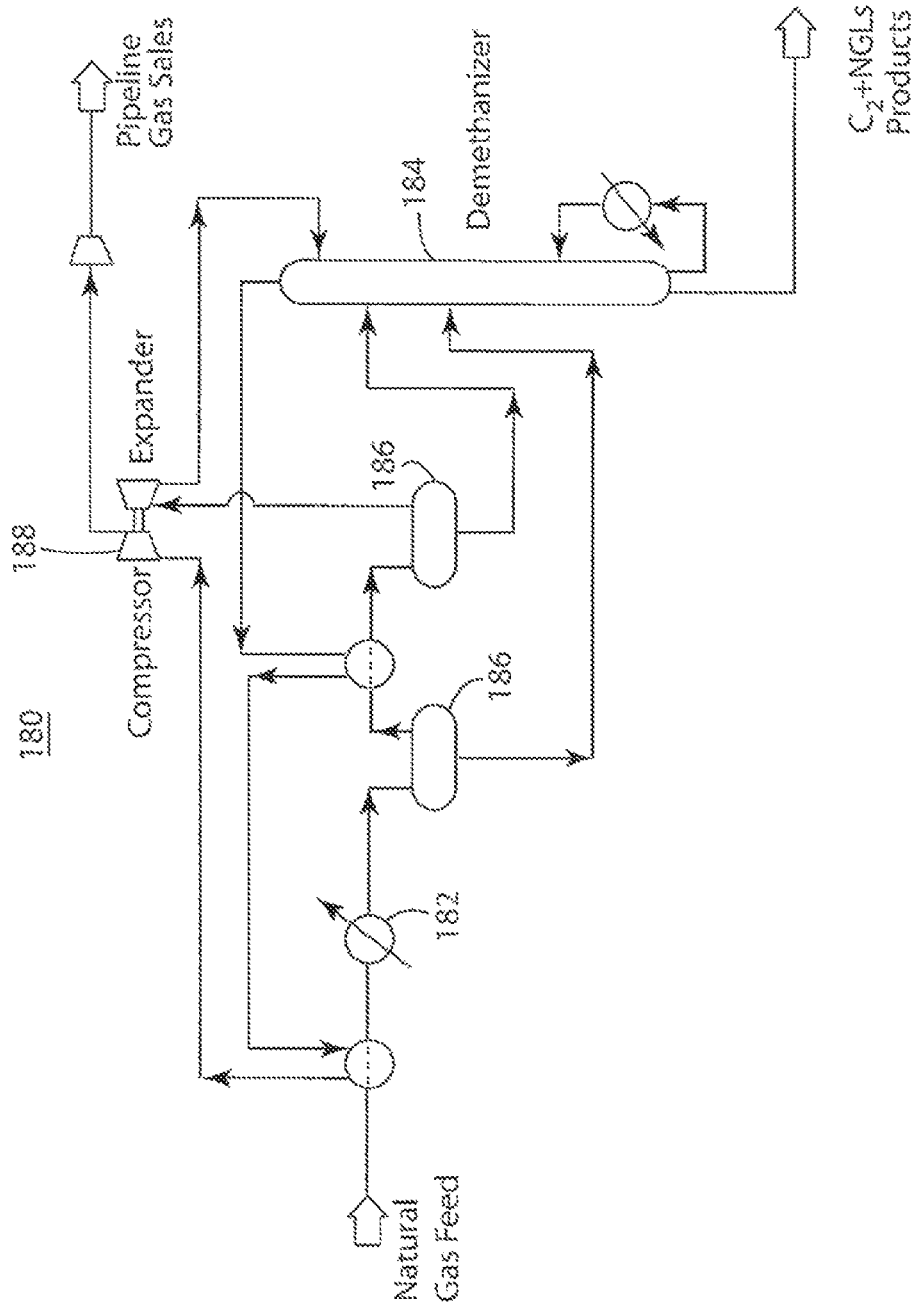
FIG. 7 is schematic diagram of an alternative NGL recovery unit.

To provide some perspective of the novel structure shown in FIG. 6, FIG. 7 shows a first alternative NGL recovery unit 180 that includes, besides some of the components of the NGL unit 94, a propane refrigerating unit 182, a demethanizer unit 184, and plural separators 186. According to this process, chilled gas is isentropically expanded through a high speed centrifugal turbine 188, to produce cryogenic temperatures (about −100° C.), so that ethane can be recovered (range 75%-85%). Condensed ethane and the chilled stream enter near a top of the demethanizer column 184 for removing excess methane from the C2+ NGL product. Energy recovered by the gas expander is utilized to compress the lower pressure gas to reduce the overall gas compression requirements of the facility.

However, some disadvantages of the structure shows in FIG. 7 include the need of a separated refrigeration loop, glycol injection for dehydration, two separations needed before the demethanizer, high cost and weight due to many equipment components, demethanizer boiler 184 leads to complications of the control system, etc.

Figure 8:
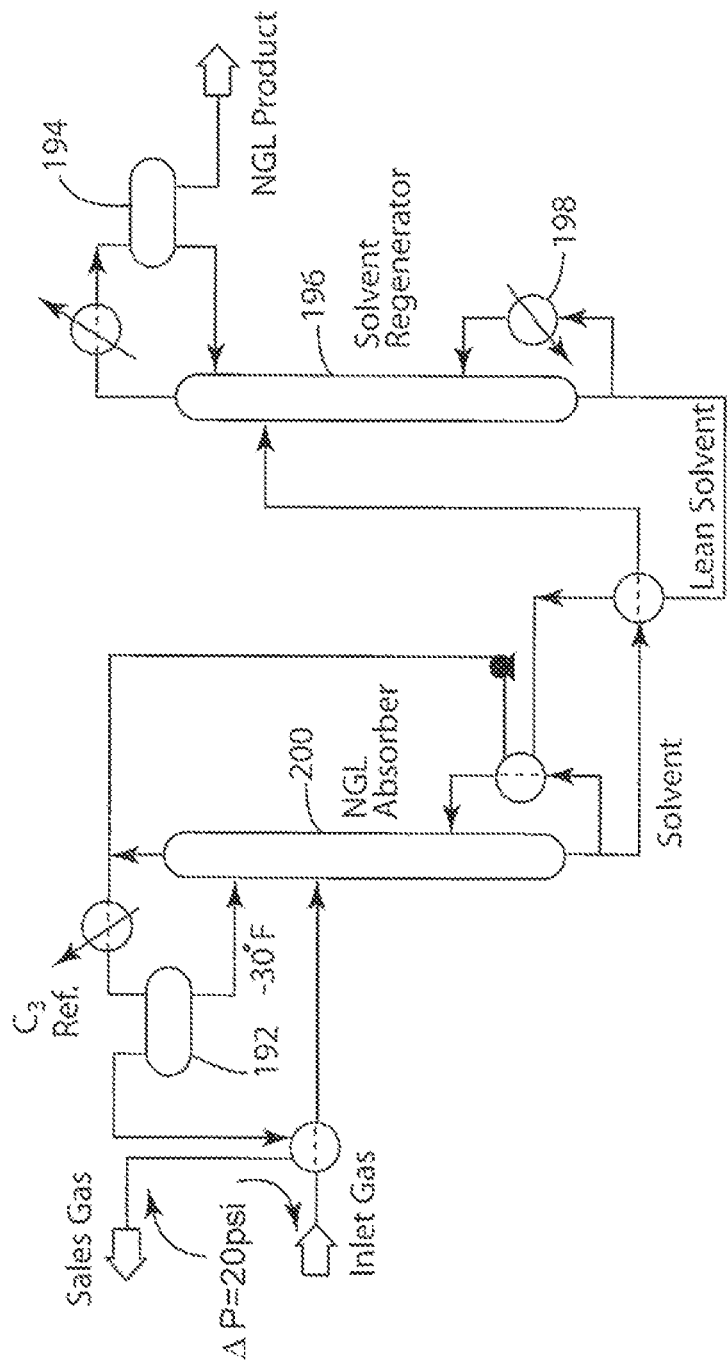
FIG. 8 is a schematic diagram of another alternative NGL recovery unit.

FIG. 8 shows a second alternative NGL recovery unit 190 that includes, among other things, separators 192 and 194, a solvent regenerator 196, a solvent injecting unit 198, etc. This process of NGL recovery utilizes non-cryogenic absorption to recover C2+ or C3+ natural gas liquids (NGL) from natural gas streams. The absorbed NGL in the rich solvent from the bottom of the NGL absorber column 200 are fractionated in the solvent regenerator column 196 which separates NGL overhead and lean solvent produced at the bottom. After heat recuperation, the lean solvent is presaturated with absorber overhead gases. The chilled solvent flows in the top of the absorber column 200. The separated gas from the presaturator separator 192 produces the pipeline sales gas. However, this alternative structure needs a solvent and uses an external refrigerant.

According to an exemplary embodiment illustrated in FIG. 9, there is a method for separating natural gas liquids (NGL) from a feed gas. The method includes a step 900 of receiving the feed gas, a step 902 of increasing a pressure of the feed gas by running the feed gas through a compressor connected to a gas turbine, a step 904 of diverting part of the feed gas from an output of the compressor and feeding the diverted part to a dryer, a step 906 of drying the diverted part to remove water and produce a dry gas, a step 908 of expanding the dry gas in a turbo-expander, a step 910 of separating the expanded gas into the NGL and fuel gas, and a step 912 of providing the fuel gas to the gas turbine as fuel.

The disclosed exemplary embodiments provide a compression station, a processing facility and a method for separating NGL mix and fuel gas from a feed gas stream. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A natural gas liquids (NGL) recovery system comprising:
    an inlet configured to receive feed gas from a first location of a transportation pipeline;
    a dehydration unit connected to the inlet to receive the feed gas and configured to extract predetermined components from the feed gas to produce a dry gas;
    a NGL unit configured to receive the dry gas from the dehydration unit and configured to separate the dry gas into a fuel gas and a NGL mix;
    a first outlet connected to the NGL unit and configured to output the fuel gas to a gas turbine to be ignited; and
    a second outlet connected to the NGL unit and configured to output the NGL mix back to the transportation pipeline, at a second location situated downstream from the first location.

2. The system of claim 1, wherein the feed gas is at a pressure higher than the cricondenbar.

3. The system of claim 1, wherein the dehydration unit does not include a wet gas cooler followed by a separator to remove the condensed water from the regeneration gas stream, does not include a regeneration gas re-compression system and does not contaminate the dry gas stream.

4. The system of claim 1, wherein the NGL unit comprises:
    heat exchangers for changing a temperature of the received dry gas;
    a turbo-expander equipped with magnetic bearings connected to the heat exchangers and configured to receive cooled dry gas from the heat exchangers and to isentropically expand the cooled dry gas; and
a separator connected to the turbo-expander and configured to separate a fluid phase from a gas phase of the cooled dry gas.

5. The system of claim 4, wherein the NGL unit further comprises:
a compressor connected to the separator and configured to compress the fuel gas prior to providing the fuel gas to the gas turbine.

6. The system of claim 5, wherein the NGL unit further comprises:
a pump connected to the separator and configured to pump the NGL mix back to the pipeline.

7. The system of claim 1, wherein the NGL unit does not include a demethanizer or a glycol injecting unit.

8. A station for pumping natural gas liquids (NGL) in a transportation pipeline, the station comprising:
a turbo-compressor package connected to a pipeline inlet and configured to raise a low pressure of an input feed gas to a high pressure;
an NGL recovery package connected to the turbo-compressor package and configured to receive the feed gas having the high pressure; and
a filter package configured to receive a fuel gas from the NGL recovery package, to heat and filter the received fuel gas, and to provide the heated and filtered fuel gas to the turbo-compressor as fuel;
wherein the NGL recovery package comprises;
an inlet configured to receive the feed gas from a first location of the transportation pipeline;
a dehydration unit connected to the inlet to receive the feed gas and configured to extract predetermined components from the feed gas to produce a dry gas;
a NGL unit configured to receive the dry gas from the dehydration unit and configured to separate the dry gas into a fuel gas and a NGL mix;
a first outlet connected to the NGL unit and configured to output the fuel gas to the filter package; and
a second outlet connected to the NGL unit and configured to output the NGL mix back to the transportation pipeline, at a second location situated downstream from the first location.

9. A processing system for separating natural gas liquids (NGL), the system comprising:
a turbo-compressor package configured to compress an input feed gas that flows through a transportation pipeline to a first location of the transportation pipeline to raise a low pressure of the input feed gas to a high pressure;
an NGL recovery package connected to the turbo-compressor package and configured to receive the feed gas having the high pressure; and
a filter package configured to receive a fuel gas from the NGL recovery package, to heat and filter the received fuel gas, and to provide the heated and filtered fuel gas to the turbo-compressor as fuel;
wherein the NGL recovery package comprises;
an inlet configured to receive the feed gas having a high pressure;
a dehydration unit connected to the inlet to receive the feed gas and configured to extract predetermined components from the feed gas to produce a dry gas;
a NGL unit configured to receive the dry gas from the dehydration unit and configured to separate the dry gas into a fuel gas and a NGL mix;
a first outlet connected to the NGL unit and configured to output the fuel gas to the filter package; and
a second outlet connected to the NGL unit and configured to output the NGL mix to the transportation pipeline at a second location situated downstream from the first location.

10. A method for separating natural gas liquids (NGL) from a feed gas, the method comprising:
receiving the feed gas;
increasing a pressure of the feed gas by running the feed gas through a compressor connected to a as turbine;
diverting part of the feed gas from an output of the compressor and feeding the diverted part to a dryer;
drying the diverted part to remove water and produce a dry gas;
expanding the dry gas in a turbo-expander;
separating the expanded gas into the NGL and fuel gas; and
providing the fuel gas to the gas turbine as fuel without contamination.

11. The method of claim 10, wherein the feed gas is at a pressure higher than the cricondenbar.

12. The method of claim 10, wherein receiving the feed gas comprises providing an NGL recovery system having an inlet configured to receive the feed gas at a first location of a transportation pipeline.

13. The method of claim 10, wherein separating the expanded vas into the NGL and fuel gas comprises providing a NGL unit coupled to a dehydration unit and configured to receive the dry gas.

14. The method of claim 10, wherein providing the fuel gas to the gas turbine comprises providing an outlet connected to the NGL unit and configured to output the fuel gas to the gas turbine to be ignited.

15. The method of claim 10, wherein separating the expanded gas into the NGL and fuel gas comprises providing a separator connected to the turbo-expander and configured to separate a fluid phase from a gas phase of the cooled dry gas.

16. The method of claim 13, wherein the NGL unit does not include a demethanizer or a glycol injecting unit.

17. The station of claim 8, wherein the feed gas is at a pressure higher than the cricondenbar.

18. The station of claim 8, wherein the dehydration unit does not include a wet gas cooler followed by a separator to remove the condensed water from the regeneration gas stream, does not include a regeneration gas re-compression system and does not contaminate the dry gas stream.

19. The processing system of claim 9, wherein the feed gas is at a pressure higher than the cricondenbar.

20. The processing system of claim 9, wherein the dehydration unit does not include a wet gas cooler followed by a separator to remove the condensed water from the regeneration gas stream, does not include a regeneration gas re-compression system and does not contaminate the dry gas stream.

* * * * *